US012636934B2

(12) United States Patent
     Gongate

(10) Patent No.: US 12,636,934 B2
(45) Date of Patent: May 26, 2026

(54) METHOD FOR REDUCING FUEL CONSUMPTION

(71) Applicant: Carrier Corporation, Palm Beach Gardens, FL (US)

(72) Inventor: Suzankumar Danaiah Gongate, Hyderabad (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 129 days.

(21) Appl. No.: 18/329,336

(22) Filed: Jun. 5, 2023

(65) Prior Publication Data

US 2023/0391164 A1    Dec. 7, 2023

Related U.S. Application Data

(60) Provisional application No. 63/349,407, filed on Jun. 6, 2022.

(51) Int. Cl.
     *B60H 1/00* (2006.01)
     *B60P 3/20* (2006.01)
(52) U.S. Cl.
     CPC ..... *B60H 1/00764* (2013.01); *B60H 1/00428* (2013.01); *B60P 3/20* (2013.01)
(58) Field of Classification Search
     CPC .............. B60H 1/00764; B60H 1/3204; B60H 1/3205; B60H 1/3208; B60H 2001/3238; B60H 2001/3266; B60H 2001/3239; B60H 2001/3241; B60H 2001/3277; B60H 1/3232; B60P 3/20
     See application file for complete search history.

(56) References Cited

U.S. PATENT DOCUMENTS

| | | | | |
|---|---|---|---|---|
| 5,103,783 A | * | 4/1992 | Hanson | ................... F02D 41/22 |
| | | | | 123/198 D |
| 5,623,835 A | * | 4/1997 | Layman | ............. B60H 1/00764 |
| | | | | 62/133 |

(Continued)

FOREIGN PATENT DOCUMENTS

| | | | | |
|---|---|---|---|---|
| EP | 2301778 A1 | * | 3/2011 | ......... B60H 1/00899 |
| WO | 2017093785 A1 | | 6/2017 | |

OTHER PUBLICATIONS

"Determining Air Flow", 2009, Veris Industries, vo. 10092, pp. 1-2 (Year: 2009).*

(Continued)

*Primary Examiner* — Erin M Piateski
*Assistant Examiner* — Ashley Tiffany Schoech
(74) *Attorney, Agent, or Firm* — CANTOR COLBURN LLP

(57) ABSTRACT

A method of operating a component of a transport refrigeration unit (TRU) of a vehicle is provided. The method includes determining whether an engine parameter value of the vehicle exceeds a predefined level, computing a vehicle parameter value from the engine parameter value if the engine parameter value exceeds the predefined level, obtaining a nominal value of the vehicle parameter value for which the component is rated, determining whether the vehicle parameter value is equal to or greater than the nominal value and switching the component off if the vehicle parameter value is equal to or greater than the nominal value.

16 Claims, 4 Drawing Sheets

(56)     References Cited

U.S. PATENT DOCUMENTS

| 6,492,741 | B1 * | 12/2002 | Morimoto | B60K 6/485 |
| | | | | 290/40 C |
| 2006/0086113 | A1 | 4/2006 | Errington et al. | |
| 2008/0228351 | A1 * | 9/2008 | Mc Gee | B60L 50/16 |
| | | | | 701/36 |
| 2016/0089956 | A1 | 3/2016 | Viegas et al. | |
| 2019/0381864 | A1 * | 12/2019 | Watanabe | B60H 1/3205 |
| 2020/0132333 | A1 * | 4/2020 | Gillmen | F24F 11/86 |
| 2021/0025364 | A1 * | 1/2021 | Hao | F02D 41/064 |

OTHER PUBLICATIONS

"How to calculate wheel and vehicle speed from engine speed", Apr. 12, 2022, X-Engineer (Year: 2022).*

Search Report issued in European Patent Application No. 23177400. 1; Application Filing Date Jun. 5, 2023; Date of Mailing Nov. 8, 2023 (10 pages).

X-engineer, "How to calculate wheel and vehicle speed from engine speed" X-engineer <URL: https://x-engineer.org/calculate-wheel-vehicle-speed-engine-speed/> accessed: May 29, 2023 (7 pages).

* cited by examiner

METHOD FOR REDUCING FUEL CONSUMPTION

CROSS-REFERENCE TO RELATED APPLICATIONS

This application claims the benefit of U.S. Provisional Application No. 63/349,407 filed Jun. 6, 2022, the disclosure of which is incorporated herein by reference in its entirety.

BACKGROUND

The following description relates to methods for reducing fuel consumption and, more specifically, to methods for reducing fuel consumption in Light Commercial Vehicles (LCVs) using transport refrigeration units (TRUs)

In transportation applications, TRUs can be built onto trailers and are configured to condition the interiors of those trailers. This allows the trailers to transport perishable goods, such as produce and medical supplies, over long distances. In the absence of the TRUs, the interiors of the trailers can get hot especially on hot days and that could negatively affect the cargo being transported. With TRUs in place, the perishable goods can be maintained at the proper temperatures in the interiors regardless of ambient conditions outside.

The TRUs remove or provide heat to the interior air based on setpoints. Power for the TRUs to do so can come from energy storage devices, such as batteries or fossil fuel driven engine or an electric generator connected to vehicle engine. In the latter case, reducing fuel consumption without otherwise affecting the ability of the TRUs to condition trailer interiors is becoming increasingly important.

BRIEF DESCRIPTION

According to an aspect of the disclosure, a method of operating a component of a transport refrigeration unit (TRU) of a vehicle is provided. The method includes determining whether an engine parameter value of the vehicle exceeds a predefined level, computing a vehicle parameter value from the engine parameter value if the engine parameter value exceeds the predefined level, obtaining a nominal value of the vehicle parameter value for which the component is rated, determining whether the vehicle parameter value is equal to or greater than the nominal value and switching the component off if the vehicle parameter value is equal to or greater than the nominal value.

In accordance with additional or alternative embodiments, the method further includes initially obtaining vehicle information from which at least the vehicle parameter value and the nominal value are partially derived.

In accordance with additional or alternative embodiments, the method further includes confirming that an ignition of the vehicle is on, obtaining the engine parameter value from a generator tachometer if the ignition is on and determining that the engine parameter value is within a predefined range.

In accordance with additional or alternative embodiments, the determining of whether the engine parameter value exceeds the predefined level is executed if the engine parameter value is within the predefined range.

In accordance with additional or alternative embodiments, the predefined range includes a range of unit run speeds.

In accordance with additional or alternative embodiments, the computing of the vehicle parameter value includes computing a speed of the vehicle from the engine parameter value, determining whether the speed of the vehicle is changing and computing the vehicle parameter value if the speed of the vehicle is changing.

In accordance with additional or alternative embodiments, the computing of the speed of the vehicle is based on the engine parameter value, a gearbox gear ratio, a final drive ratio and a tire size marking.

In accordance with additional or alternative embodiments, the component includes a condenser fan of the TRU, the engine parameter value includes a revolutions per minute (RPM) of the engine and the vehicle parameter value includes an air flow due to vehicle motion.

In accordance with additional or alternative embodiments, the switching of the component off if the vehicle parameter value is equal to or greater than the nominal value includes commanding a condenser fan motor of the condenser fan to switch off.

In accordance with additional or alternative embodiments, the air flow due to vehicle motion is partially derived from a duct cross-sectional area of the vehicle.

According to an aspect of the disclosure, a method of operating a condenser of a transport refrigeration unit (TRU) of a vehicle is provided. The method includes determining whether revolutions per minute (RPM) of an engine of the vehicle exceeds a predefined level, computing an air flow due to motion of the vehicle from the RPM of the engine if the RPM of the engine exceeds the predefined level, obtaining a nominal air flow due to motion of the vehicle for which the condenser is rated, determining whether the air flow due to motion of the vehicle is equal to or greater than the nominal value and switching the condenser off if the air flow due to motion of the vehicle is equal to or greater than the nominal value.

In accordance with additional or alternative embodiments, the method further includes initially obtaining vehicle information from which at least the air flow due to motion of the vehicle and the nominal value are partially derived.

In accordance with additional or alternative embodiments, the method further includes confirming that an ignition of the vehicle is on, obtaining the RPM of the engine from a generator tachometer if the ignition is on and determining that the RPM of the engine is within a range of unit run speeds.

In accordance with additional or alternative embodiments, the determining of whether the RPM of the engine exceeds the predefined level is executed if the RPM of the engine is within the range of unit run speeds.

In accordance with additional or alternative embodiments, the computing of the air flow due to motion of the vehicle includes computing a speed of the vehicle from the RPM of the engine, determining whether the speed of the vehicle is changing and computing the air flow due to motion of the vehicle if the speed of the vehicle is changing.

In accordance with additional or alternative embodiments, the computing of the speed of the vehicle is based on the RPM of the engine, a gearbox gear ratio, a final drive ratio and a tire size marking.

In accordance with additional or alternative embodiments, the switching of the condenser off if the air flow due to motion of the vehicle is equal to or greater than the nominal value includes commanding a condenser fan motor of the condenser fan to switch off.

In accordance with additional or alternative embodiments, the air flow due to vehicle motion is partially derived from a duct cross-sectional area of the vehicle.

According to an aspect of the disclosure, a transport refrigeration unit (TRU) of a vehicle is provided. The TRU includes a condenser fan and a controller configured to switch off the condenser fan in an event a value of an air flow due to motion of the vehicle exceeds a nominal value for which the condenser fan is rated.

In accordance with additional or alternative embodiments, preconditions of the controller switching off the condenser fan are that an ignition of the vehicle is turned on and that an engine speed of the vehicle exceeds a predefined value.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

For TRU operations, fuel prices play a major role in increasing or decreasing operating expenses of TRU customers. This operating expense can be reduced by reducing electrical loads on TRUs, which, in turn, reduce fuel consumption by the TRUs. One of the electrical loads that can be considered for reduction is that of the condenser fan. The condenser fan of a TRU is typically mounted over a condenser coil for heat extraction and is a power consuming component due to the need to drive the condenser fan to rotate. Switching the condenser fan off in certain instances can thus reduce power consumption and an overall level of fuel consumption.

As will be described below, electrical loading on an LCV TRU generator can be reduced by the condenser fan being switched off when the vehicle is in motion and the speed of vehicle is equal or greater than a predefined speed. When the vehicle is moving, an interaction between outside air and the vehicle results in the formation of airflows as the vehicle passes through the air around it. When the vehicle is moving at equal or greater than the predefined speed, this airflow provides for sufficient cubic feet per minute (CFM) of air for the TRU's operation. Thus, during this time, even if the condenser fan is switched off, TRU operation will not be affected. A determination of the vehicle speed can be accomplished by tachometers built into LCV TRUs or the generator (power source to TRUs) coupled to vehicle engine. These tachometers provide a reading of engine rpm to a control unit. Using this engine rpm as an input, an approximate vehicle speed can be computed. From this, a CFM experienced by a condenser can also be computed so that the condenser fan can be switch off. In some cases, a decision to switch off the condenser fan can only be made when it is determined that the vehicle is moving (i.e., in a road mode) and the engine speed is above the predefined value. In this way, switching off the condenser fan while the vehicle is in an idling condition, a standby mode or a slow moving condition can be avoided.

Figure 1:
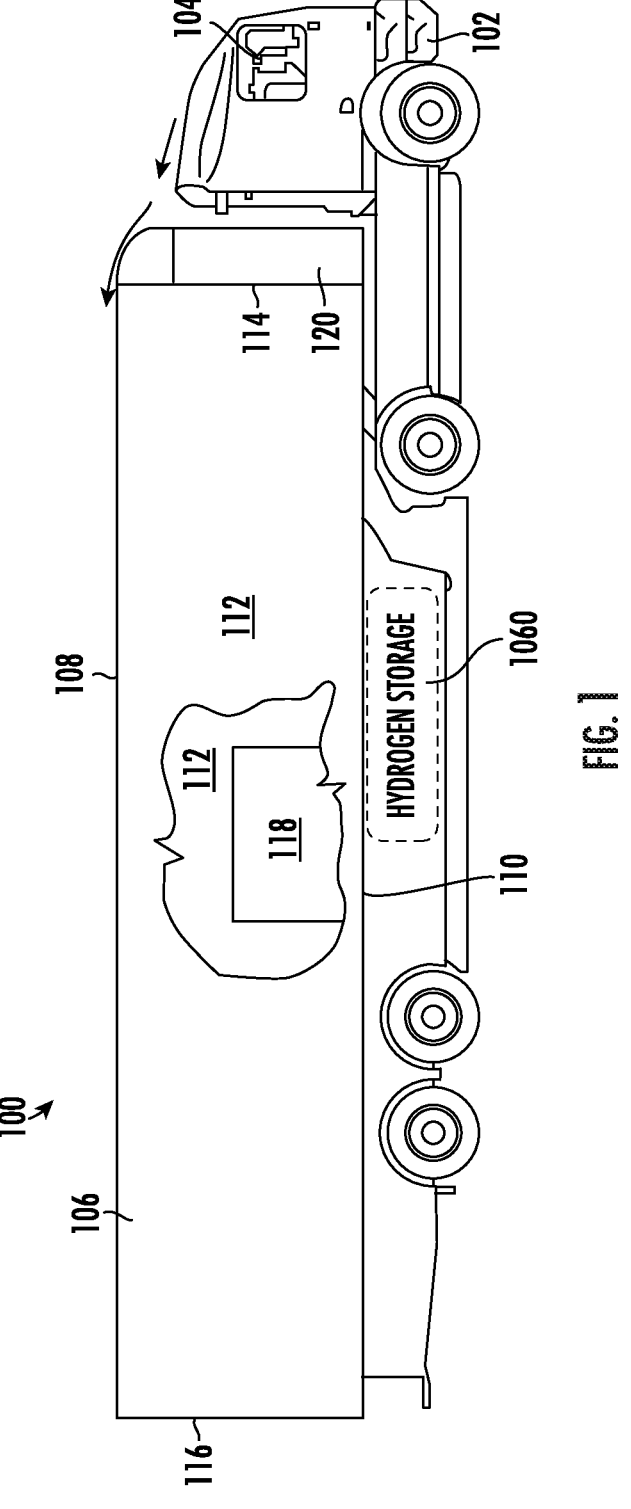
FIG. 1 depicts a tractor trailer system having a TRU and a cargo compartment in accordance with exemplary embodiments.

With reference to FIG. 1, a tractor trailer system 100 is provided. The tractor trailer system 100 includes a tractor 102 including an operator's compartment or cab 104 and an engine, which acts as the drive system of the tractor trailer system 100. A trailer 106 is coupled to the tractor 102. The trailer 106 is a refrigerated trailer 106 and includes a top wall 108, a directly opposed bottom wall 110, opposed side walls 112 and a front wall 114, with the front wall 114 being closest to the tractor 102. The trailer 106 further includes a door or doors (not shown) at a rear wall 116, opposite the front wall 114. The walls of the trailer 106 define a cargo compartment. The trailer 106 is configured to maintain a cargo 118 located inside the cargo compartment at a selected temperature through the use of a TRU 120 located on the trailer 106. The TRU 120, as shown in FIG. 1, can be located at or attached to the front wall 114. The trailer 106 can also include a hydrogen storage container 1060 provided below the bottom wall 110.

Although described herein that the TRU 120 may be attached to a tractor trailer, it should be appreciated that the TRU 120 described herein may be suitable for any refrigerated cargo system (e.g., tractor trailer, container, unit load device, etc.).

Figure 2:
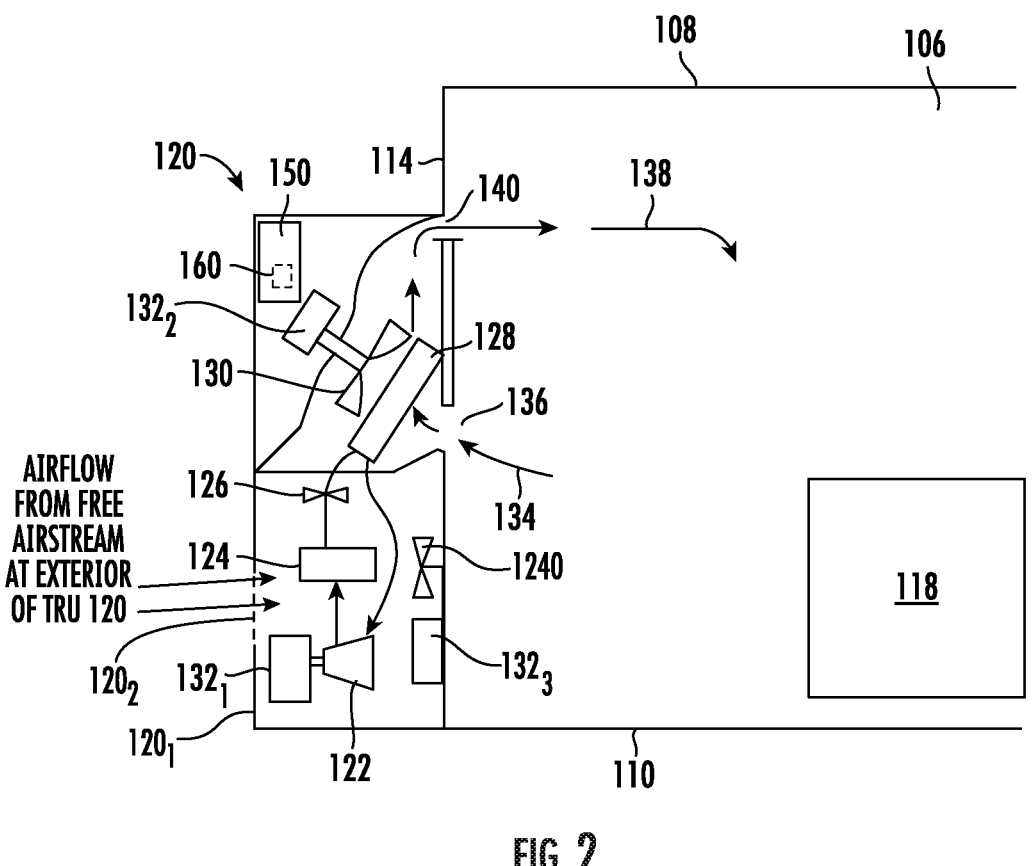
FIG. 2 depicts a TRU for a cargo compartment of the tractor trailer system of FIG. 1 in accordance with exemplary embodiments.

With reference to FIG. 2, the TRU 120 is shown in more detail. The TRU 120 includes a housing $120_1$ with intakes $120_2$. The TRU 120 further includes a compressor 122, a condenser 124 with a condenser fan 1240, an expansion valve 126, an evaporator 128 and an evaporator fan 130. The compressor 122 is operably connected to a compressor motor $132_1$, which is receptive of power and uses that power to drive the compressor 122. The evaporator fan 130 is operably connected to an evaporator fan motor $132_2$, which is receptive of power and uses that power to drive the evaporator fan 130. The condenser fan 1240 is operably connected to a condenser fan motor $132_3$, which is receptive of power and uses that power to drive the condenser fan 1240. Airflow is circulated into and through the cargo compartment of the trailer 106 by means of the TRU 120. A return airflow 134 flows into the TRU 120 from the cargo compartment of the trailer 106 through a refrigeration unit inlet 136 and across the evaporator 128 via the evaporator fan 130, thus cooling the return airflow 134. The cooled return airflow 134, now referred to as supply airflow 138, is supplied into the cargo compartment of the trailer 106 through a refrigeration unit outlet 140, which in some embodiments is located near the top wall 108 of the trailer 106. The supply airflow 138 cools the cargo 118 in the cargo compartment of the trailer 106. Also included in the cargo compartment can be a refrigerant leak sensor 150 for detecting a leak of a particular type of refrigerant or substance. It is to be understood that the refrigerant leak sensor 150 can be located in different locations in the system and is not limited by the example shown in FIG. 2. For example, the refrigerant leak sensor 150 can be located in the evaporator section of the TRU 120, a different portion of the cargo compartment of the trailer 106 or another location in the system. Upon detection by the refrigerant leak sensor 150, a signal can be transmitted to controller 160.

The controller 160 controls various aspects of the TRU 120 and the TRU power system. The controller 160 can control the compressor 122, the condenser 124, the expansion valve 126, the evaporator 128 and the evaporator fan 130 in addition to other equipment or sensors. The controller 160 can also control operations of the compressor motor $132_1$, the evaporator fan 130 and the evaporator fan motor $132_2$ as well as the condenser fan 1240 and the condenser fan motor $132_3$. The controller 160 can be connected to the equipment over a wired or wireless connection (connections not shown). In some cases, the controller 160 can be configured to perform a low charge diagnostics calculation which is used to perform various calculations of the refrigeration system of the TRU 120 to determine a state of operation. In other embodiments, the low charge diagnostics calculation can be performed in a cloud network (not shown in FIG. 2).

Figure 3:
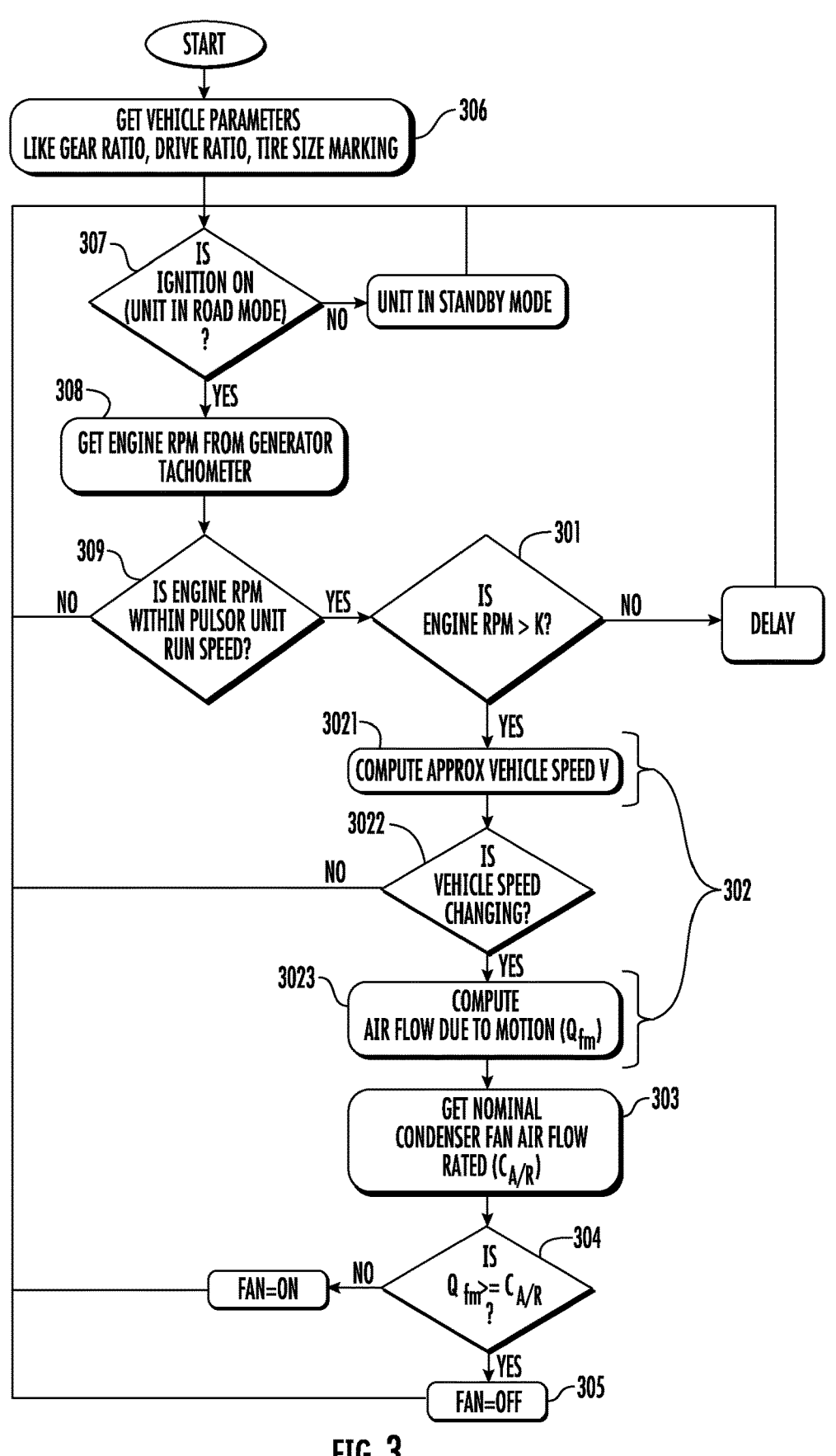
FIG. 3 is a method of operating a condenser of a TRU of a vehicle in accordance with exemplary embodiments.

With continued reference to FIGS. 1 and 2 and with additional reference to FIG. 3, the TRU 120 as described above includes the condenser fan 1240, the condenser fan motor $132_3$ and the controller 160. As will be described below in greater detail, the controller 160 is configured to switch off the condenser fan 1240 directly and/or by controlling the condenser fan motor $132_3$ in an event a value of an air flow due to motion of the vehicle (i.e., an LCV or the tractor 102 of FIG. 1) exceeds a nominal value for which the condenser fan 1240 is rated. By switching off the condenser fan 1240 in this manner, fuel consumption can be reduced. At the same time, since the value of the air flow due to the motion of the vehicle (i.e., an LCV or the tractor 102 of FIG. 1) exceeds the nominal value for which the condenser fan 1240 is rated, an amount of air flow that can be directed over the condenser 124 via the intakes $120_2$ from the free airstream at an exterior is sufficient to make up for the lack of air flow which would otherwise be generated by the condenser fan 1240. In accordance with embodiments, as a way to prevent an undesirable switching off of the condenser fan 1240, preconditions of the controller 160 switching off the condenser fan 1240 are that an ignition of the vehicle is turned on and that an engine speed of the vehicle exceeds a predefined value.

As shown in FIG. 3, a method of operating a component of a TRU of a vehicle, such as the condenser 1240 of the TRU 120 of FIGS. 1 and 2, is provided. The method includes determining whether an engine parameter value of the vehicle exceeds a predefined level (block 301), computing a vehicle parameter value from the engine parameter value if the engine parameter value exceeds the predefined level (block 302), obtaining a nominal value of the vehicle parameter value for which the component is rated (block 303), determining whether the vehicle parameter value is equal to or greater than the nominal value (block 304) and switching the component OFF if the vehicle parameter value is equal to or greater than the nominal value (block 305). The switching of the component OFF if the vehicle parameter value is equal to or greater than the nominal value of the operation of block 305 can include commanding the condenser fan motor $132_3$ of the condenser fan 1240 to switch OFF.

While the method of FIG. 3 is described herein with reference to the component of the TRU being the condenser 1240 of the TRU 120 of FIGS. 1 and 2, it is to be understood that the method can be compatible with other components (and other types of vehicles). Notwithstanding this point, the following description will relate to the case of the component of the TRU being the condenser 1240 of the TRU 120 of FIGS. 1 and 2. This is being done for purposes of clarity and brevity and should not be interpreted as limiting the disclosure in any way.

In accordance with additional embodiments, the method of FIG. 3 can further include initially obtaining vehicle information from which at least the vehicle parameter value and the nominal value are partially derived (block 306). In addition, the method can include confirming that an ignition of the vehicle is ON (block 307), obtaining the engine parameter value from a generator tachometer if the ignition is on (block 308) and determining that the engine parameter value is within a predefined range (block 309), where the predefined range can be a range of unit run or operation speeds. The determining of whether the engine parameter value exceeds the predefined level of the operation of block 301 is executed if the engine parameter value is determined to be within the predefined range in the operation of block 309. In this way, the controller 160 is effectively prevented from undesirably switching OFF the condenser fan 1240 unless certain preconditions (i.e., that an ignition of the vehicle is turned ON and that an engine speed of the vehicle exceeds a predefined value) are met. This in turn prevents a loss of cooling of the condenser 124 during normal operations of the TRU 120.

Figure 4:
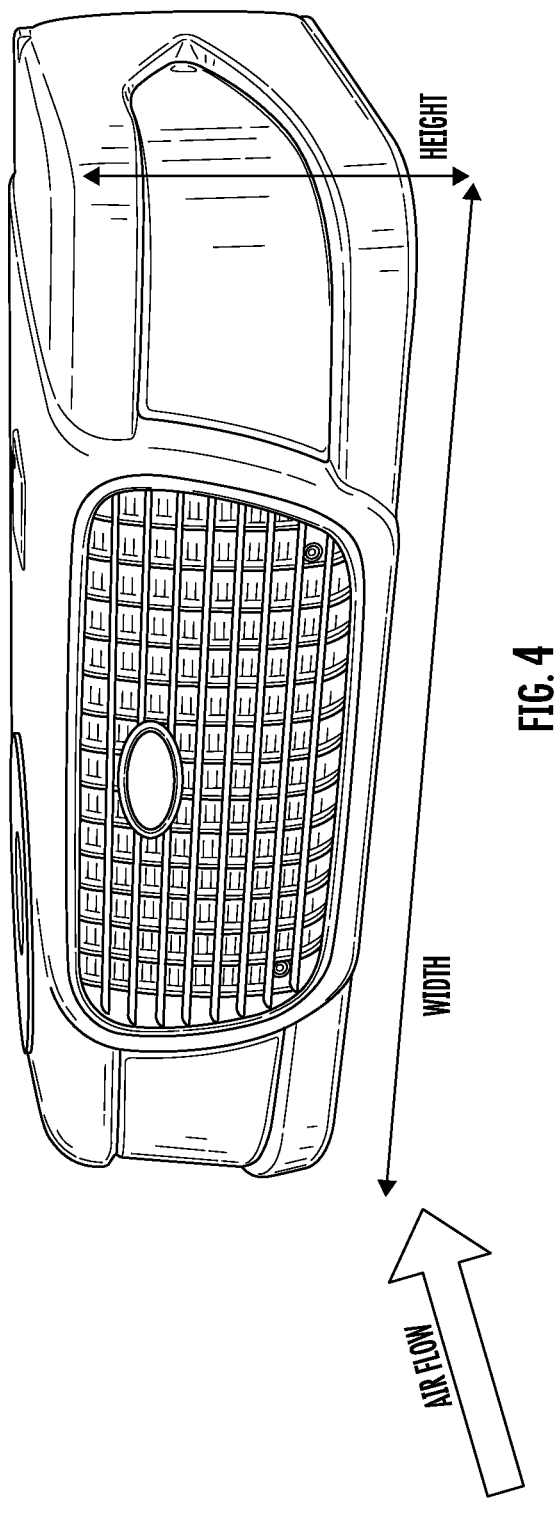
FIG. 4 is a perspective view of a duct of a TRU in accordance with exemplary embodiments.

With continued reference to FIG. 3 and with additional reference to FIG. 4 and in accordance with further embodiments, where the component of the TRU is the condenser fan 1240 as noted above, the engine parameter value can include a revolutions per minute (RPM) of the engine and the vehicle parameter value can include an air flow due to vehicle motion. In these or other cases, the computing of the vehicle parameter value of block 302 can include computing a speed of the vehicle from the engine parameter value (block 3021), determining whether the speed of the vehicle is changing (block 3022) and computing the vehicle parameter value if the speed of the vehicle is changing (block 3023). Here, the computing of the speed of the vehicle of the operation of block 3021 is based on the engine parameter value, a gearbox gear ratio, a final drive ratio and a tire size marking as expressed in the following equation:

$$V_v[\text{kph}] = V_w[\text{kph}] = \frac{3.6 \cdot N_e \cdot \pi \cdot r_w}{30 \cdot i_x \cdot i_0}$$

where $N_e$ is the engine speed, $i_x$ is the gearbox gear ratio, $i_0$ is the final drive ratio and $r_w$ is the wheel radius. These data points can be obtained in the obtaining of the vehicle information in the operation of block 306. In addition, the air flow due to vehicle motion can be partially derived from a duct cross-sectional area of the vehicle (i.e., Air Flow in CFM (Q)=Flow Velocity in Feet Per Minute (V)×Duct Cross Sectional Area (A) as illustrated in FIG. 4 where the Duct Cross Sectional Area (A) is Width×Height). The final value found for the air flow in these, or other cases can—also take account for losses due to duct inlet filters and internal components of the TRU 120, the condenser 124 and/or the condenser fan 1240.

Technical effects and benefits of the present disclosure are that it can be implemented as a software change at little to no cost and a reduction in fuel consumption.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of operating a component of a transport refrigeration unit (TRU) of a vehicle, the method comprising:

determining whether an engine parameter value of an engine of the vehicle exceeds a predefined level;

computing a vehicle parameter value of the vehicle from the engine parameter value if the engine parameter value exceeds the predefined level;

obtaining a nominal value of the vehicle parameter value for which the component is rated;

determining whether the vehicle parameter value is equal to or greater than the nominal value; and switching the component off if the vehicle parameter value is equal to or greater than the nominal value, wherein:

the computing of the vehicle parameter value comprises computing a speed of the vehicle from the engine parameter value, determining whether the speed of the vehicle is changing and computing the vehicle parameter value if the speed of the vehicle is changing, and the component comprises a condenser fan of the TRU, the engine parameter value comprises a revolutions per minute (RPM) of the engine and the vehicle parameter value comprises an air flow due to vehicle motion.

2. The method according to claim 1, further comprising:

confirming that an ignition of the vehicle is on;

obtaining the engine parameter value from a generator tachometer if the ignition is on; and determining that the engine parameter value is within a predefined range.

3. The method according to claim 2, wherein the determining of whether the engine parameter value exceeds the predefined level is executed if the engine parameter value is within the predefined range.

4. The method according to claim 2, wherein the predefined range comprises a range of unit run speeds.

5. The method according to claim 1, wherein the computing of the speed of the vehicle is based on the engine parameter value, a gearbox gear ratio, a final drive ratio and a tire size marking.

6. The method according to claim 1, wherein the switching of the component off if the vehicle parameter value is equal to or greater than the nominal value comprises commanding a condenser fan motor of the condenser fan to switch off.

7. The method according to claim 1, wherein the air flow due to vehicle motion is partially derived from a duct cross-sectional area of the vehicle.

8. A method of operating a condenser of a transport refrigeration unit (TRU) of a vehicle, the method comprising:

determining whether revolutions per minute (RPM) of an engine of the vehicle exceeds a predefined level;

computing an air flow due to motion of the vehicle from the RPM of the engine if the RPM of the engine exceeds the predefined level;

obtaining a nominal air flow due to motion of the vehicle for which the condenser is rated;

determining whether the air flow due to motion of the vehicle is equal to or greater than the nominal value; and switching the condenser off if the air flow due to motion of the vehicle is equal to or greater than the nominal value.

9. The method according to claim 8, further comprising:

confirming that an ignition of the vehicle is on;

obtaining the RPM of the engine from a generator tachometer if the ignition is on; and determining that the RPM of the engine is within a range of unit run speeds.

10. The method according to claim 9, wherein the determining of whether the RPM of the engine exceeds the predefined level is executed if the RPM of the engine is within the range of unit run speeds.

11. The method according to claim 8, wherein the computing of the air flow due to motion of the vehicle comprises:

computing a speed of the vehicle from the RPM of the engine;

determining whether the speed of the vehicle is changing; and computing the air flow due to motion of the vehicle if the speed of the vehicle is changing.

12. The method according to claim 11, wherein the computing of the speed of the vehicle is based on the RPM of the engine, a gearbox gear ratio, a final drive ratio and a tire size marking.

13. The method according to claim 8, wherein the switching of the condenser off if the air flow due to motion of the vehicle is equal to or greater than the nominal value comprises commanding a condenser fan motor to switch off.

14. The method according to claim 8, wherein the air flow due to vehicle motion is partially derived from a duct cross-sectional area of the vehicle.

15. A transport refrigeration unit (TRU) of a vehicle, the TRU comprising:

a condenser fan; and a controller configured to switch off the condenser fan in an event a value of an air flow due to motion of the vehicle exceeds a nominal value for which the condenser fan is rated.

16. The TRU according to claim 15, wherein preconditions of the controller switching off the condenser fan are that an ignition of the vehicle is turned on and that an engine speed of the vehicle exceeds a predefined value.

* * * * *